(12) United States Patent
Li et al.

(10) Patent No.: US 9,923,199 B2
(45) Date of Patent: Mar. 20, 2018

(54) METHOD FOR PREPARING CARBON-COATED LITHIUM TITANATE

(71) Applicant: Dongfang Electric Corporation, Chengdu, Sichuan (CN)

(72) Inventors: Mingke Li, Sichuan (CN); Zi Liang, Sichuan (CN); Rui Wang, Sichuan (CN)

(73) Assignee: Dongfang Electric Corporation, Chengdu, Sichuan (CN)

( * ) Notice: Subject to any disclaimer, the term of this patent is extended or adjusted under 35 U.S.C. 154(b) by 223 days.

(21) Appl. No.: 14/864,467

(22) Filed: Sep. 24, 2015

(65) Prior Publication Data

US 2016/0218355 A1 Jul. 28, 2016

(30) Foreign Application Priority Data

Jan. 27, 2015 (CN) .......................... 2015 1 0040686

(51) Int. Cl.
*H01M 4/36* (2006.01)
*H01M 4/485* (2010.01)
*H01M 4/583* (2010.01)
*H01M 4/131* (2010.01)
*H01M 4/1391* (2010.01)
*H01M 4/587* (2010.01)
*H01M 10/052* (2010.01)

(52) U.S. Cl.
CPC .......... *H01M 4/366* (2013.01); *H01M 4/131* (2013.01); *H01M 4/1391* (2013.01); *H01M 4/485* (2013.01); *H01M 4/583* (2013.01); *H01M 4/587* (2013.01); *H01M 10/052* (2013.01); *Y02E 60/122* (2013.01)

(58) Field of Classification Search
None
See application file for complete search history.

(56) References Cited

FOREIGN PATENT DOCUMENTS

| CN | 102024944 | * | 4/2011 |
| CN | 102931388 | * | 2/2013 |
| CN | 103730649 | * | 4/2014 |

* cited by examiner

*Primary Examiner* — Tanisha Diggs
(74) *Attorney, Agent, or Firm* — Diederiks & Whitelaw, PLC

(57) ABSTRACT

The present disclosure discloses a method for preparing carbon-coated lithium titanate, and provides a method for preparing a carbon-coated lithium titanate anode material for a lithium battery. The method prepares a lithium titanate precursor first, then coats a polymer on the surface of the precursor through emulsion polymerization, and finally performs sintering, and obtaining a carbon-coated lithium titanate material. The present disclosure obtains a carbon source of the polymer through the emulsion polymerization. The carbon source is coated on the surface of lithium titanate uniformly and compactly with a better coating effect than a common mechanical mixing method. The polymer is coated while agglomeration of a lithium titanate crystal is prevented during the emulsion polymerization process, and an obtained product has a small particle size and a uniform size. The carbon-coated lithium titanate prepared by the present disclosure has excellent cycling performance during charging and discharging at a high rate.

10 Claims, 2 Drawing Sheets

METHOD FOR PREPARING CARBON-COATED LITHIUM TITANATE

TECHNICAL FIELD

The present disclosure relates to a method for preparing an anode material for a lithium battery, and particularly to a method for preparing a carbon-coated lithium titanate material.

BACKGROUND

Spinel lithium titanate ($Li_4Ti_5O_{12}$) is a popular anode material for a lithium battery in recent years. The material, which has a relatively high potential (1.55V) for lithium, can neither react with a common electrolyte to form a Solid Electrolyte Interphase (SEI) layer, nor have lithium precipitation when overcharged. Lithium titanate, with a change in crystal cell volume smaller than 1% during intercalation and deintercalation of lithium ions, is called as a "zero strain" material with an extremely long theoretical cycle life. However, lithium titanate has a poor electronic conductivity, thus easily resulting in a capacity decrease during charging and discharging at a high rate. Therefore, carbon coating methods have been widely applied in modified synthesis of a lithium titanate materials in order to improve the electronic conductivity of lithium titanate.

In-situ polymerization disperses inorganic particles in a polymer monomer uniformly, and then polymerizes the monomer in a certain condition to form a compound particle. A polymer may be coated uniformly on the surface of an inorganic nanometer particle via in-situ emulsion polymerization, and the polymerization only needs to undergo polymerization and molding once without subsequent treatment and processing. The surface of a particle, including $TiO_2$, $Al_2O_3$, $SiO_2$, etc. may be coated using an acrylate monomer through emulsion polymerization. However, modification of lithium titanate using emulsion polymerization is rarely reported.

CN101944590A discloses a preparation method of carbon-coated lithium titanate. A lithium source and a titanium source are dispersed, and then long-chain aliphatic carboxylic acid is added and heated to prepare a precursor, and sintering is performed under the protection of an inert gas subsequently, and obtaining carbon-coated lithium titanate. A surface carbon layer is obtained by means of surface coordination of long-chain aliphatic carboxylic acid and lithium titanate, thereby improving the conductivity of lithium titanate.

CN102593444A discloses a preparation method of carbon-coated lithium titanate and a product thereof. A certain amount of commercial lithium titanate and hexadecyl trimethyl ammonium bromide are weighed and dispersed in deionized water. Resorcinol, formaldehyde and sodium carbonate are added. A precursor obtained after a reflux treatment is calcined in an inert atmosphere, and then the carbon-coated lithium titanate is obtained. A carbon layer is obtained by coating phenolic resin on the surface of the lithium titanate, thereby improving the performance of the lithium titanate.

Carbon coating is applied to a modification method of a lithium titanate material in the foregoing two patents in order to improve the conductivity of lithium titanate. However, the precursor is prepared using a hydrothermal method in CN101944590A, which requires a high temperature and a high pressure with a complicated process. Besides, the carbon source is introduced by adding and stirring directly, thus uniformity and compactness can be hardly guaranteed. In CN102593444A, the lithium titanate is coated by phenolic resin and the polymer is mixed with the lithium titanate directly. Although the carbon source is combined with the lithium titanate more closely than common mechanical mixing, the polymer is mixed in the lithium titanate irregularly, which results in poor uniformity and fails to prevent agglomeration of the lithium titanate.

SUMMARY

The present disclosure provides a method for preparing a carbon-coated lithium titanate anode material for a lithium battery. The method prepares a lithium titanate precursor first, and then coats a polymer on the surface of the precursor through emulsion polymerization, and finally performs sintering, and obtaining a carbon-coated lithium titanate material. The present disclosure can form a core-shell structure using the emulsion polymerization and control the size of a lithium titanate grain. The prepared lithium titanate material has a good processability, and the polymer is coated on the surface of lithium titanate compactly and uniformly. The method of the present disclosure is simple with low technical and device requirements, and is easy to implement mass production.

A technical solution applied by the present disclosure includes the following steps.

Step 1: A lithium-containing compound and a titanium-containing oxide are weighed according to a molar ratio of lithium ions to titanium ions of $Li^+:Ti^+=0.8$ to 0.84:1, subjected to ball milling in a ball milling jar for 4 to 8 hours, and then sintered for 5 to 10 hours, and obtained a precursor A.

Step 2: A certain amount of the precursor A obtained in Step 1 and distilled water are added to a reaction kettle, then a monomer and an emulsifier Sodium Dodecyl Sulfate (SDS) are added, vacuumizing is performed, and then nitrogen is introduced and stirred, the system is heated to 60 to 70 degrees centigrade after being fully emulsified, and an initiator, i.e. an aqueous solution of ammonium persulfate is added slowly at this temperature, a reaction is carried out for 3 to 5 hours, and then heating is stopped, and stirring is continued after the reaction is finished, methanol is added after cooling to perform demulsification, and a large amount of methanol is added subsequently to perform precipitation, and filtering is performed, and obtaining a polymer/$Li_4Ti_5O_{12}$ composite particle precursor B.

Step 3: The precursor B obtained in Step 2 is calcined for 5 to 10 hours in a nitrogen environment, obtained a carbon-coated lithium titanate material.

A method for preparing carbon-coated lithium titanate, the lithium-containing compound in Step 1 is preferably one or a mixture of several of lithium carbonate, lithium hydroxide, lithium oxalate and lithium acetate with any ratio.

A method for preparing carbon-coated lithium titanate, the titanium-containing compound in Step 1 is preferably a titanium oxide, including one or a mixture of several of rutile titanium dioxide and anatase titanium dioxide with any ratio.

A method for preparing carbon-coated lithium titanate, the sintering temperature in Step 1 is preferably 500 to 700 degrees centigrade.

A method for preparing carbon-coated lithium titanate, the feeding amount of the precursor A in Step 2 is preferably 200 g to 1000 g per liter of water.

A method for preparing carbon-coated lithium titanate, the monomer in Step 2 is preferably one or a mixture of several of Methyl Methacrylate (MMA), ethyl methacrylate and acrylate with any ratio.

A method for preparing carbon-coated lithium titanate, the mass ratio of the precursor A to the polymer monomer in Step 2 is preferably 100:10 to 30.

A method for preparing carbon-coated lithium titanate, the feeding amount of SDS in Step 2 is preferably 2 g to 4 g per liter of water.

A method for preparing carbon-coated lithium titanate, the feeding amount of the initiator in Step 2 is preferably 0.2 g to 2 g per liter of water.

A method for preparing carbon-coated lithium titanate, the high temperature calcination in Step 3 is preferably performed at 700 to 900 degrees centigrade.

Compared with a common carbon coating method, the present disclosure has the following advantages.

1. The present disclosure obtains a carbon source of the polymer through the emulsion polymerization. The carbon source of the polymer is coated on the surface of the lithium titanate uniformly and compactly through a polymerization reaction to form a shell-core structure with a better coating effect than that of a common mechanical mixing method. The polymer is coated while agglomeration of a lithium titanate crystal is prevented during the emulsion polymerization process of the present disclosure, and an obtained product has a small particle size and a uniform size.

2. The present disclosure performs sintering at a relatively low temperature to prepare the lithium titanate precursor first, and the stable precursor having a relatively small crystal size is coated. The precursor may be prepared by a plurality of lithium sources and titanium sources with a simple preparation technique.

3. The monomer and initiator used in the polymerization coating method in the present disclosure are cheap, and the step uses deionized water as a reaction medium. Reaction conditions are mild and high temperature conditions are unnecessary.

4. The present disclosure carbonizes the polymer through high temperature sintering and finishes further crystallization of the lithium titanate after preparing the lithium titanate precursor coated by the polymer. Lithium titanate grains are uniform with a small size because of the coating.

5. The carbon-coated lithium titanate prepared by the present disclosure has excellent cycle performance during charging and discharging at a high rate.

DETAILED DESCRIPTION OF THE EMBODIMENTS

Embodiment 1

Figure 1:
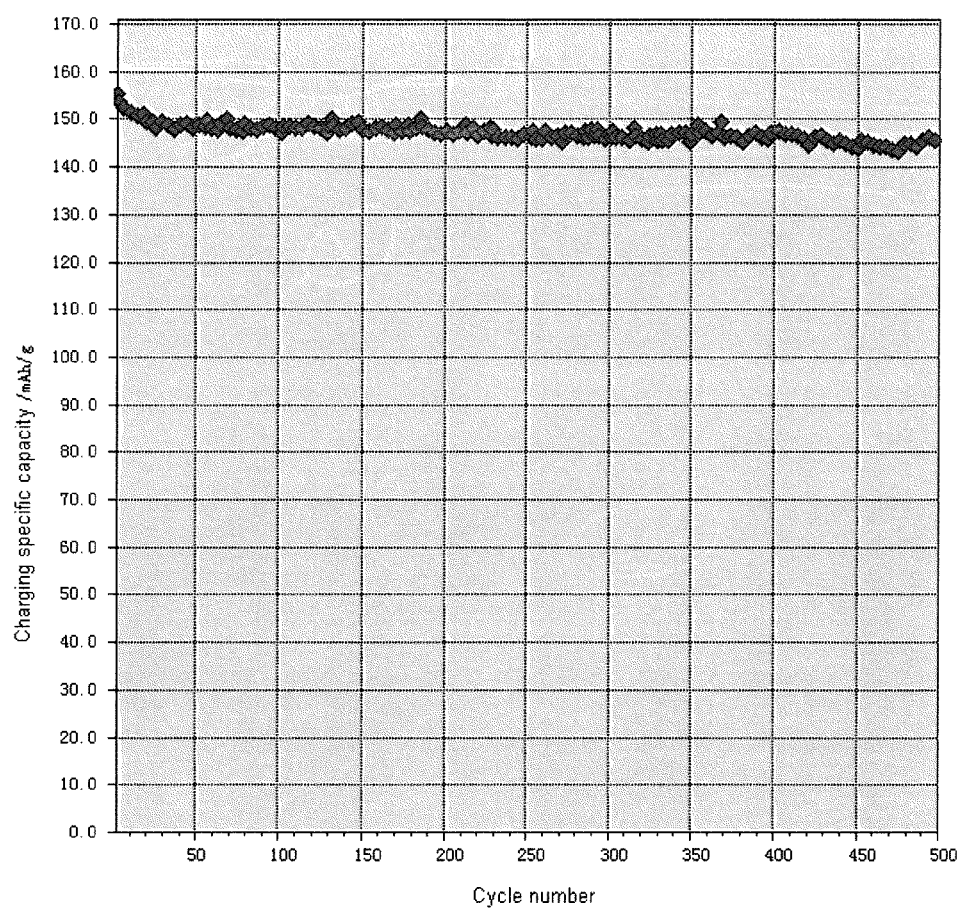
FIG. 1 is a curve illustrating 500 times of cyclic charging and discharging of a carbon-coated lithium titanate material at a rate of 1 C according to the present disclosure.

A method for preparing carbon-coated lithium titanate includes the following steps.

Step 1: A lithium-containing compound and a titanium-containing oxide are weighed according to a molar ratio of lithium ions to titanium ions of $Li^+:Ti^+=0.82:1$, subjected to ball milling in a ball milling jar for 4 hours, and then sintered for 8 hours, and obtained a precursor A. In this step, a longer period of sintering time requires a higher $Li^+:Ti^+$ ratio, and a longer period of ball milling time and a shorter period of sintering time will result in a smaller particle size of the precursor.

Step 2: 200 g of the precursor A obtained in Step 1 and 1 liter of distilled water are added to a reaction kettle, then 60 g of a monomer MMA and 2 g of an emulsifier SDS are added, vacuumizing is performed, and then nitrogen is introduced and stirred, the system is heated to 60 degrees centigrade after being fully emulsified (which means that there are no obvious large solid particles or droplets and there is no obvious sedimentation), and an initiator, i.e. an aqueous solution of ammonium persulfate (the content of ammonium persulfate is 0.2 g) is added slowly at this temperature, and a reaction is carried out for 3 hours, and then heating is stopped, and stirring is continued after the reaction is finished, after the temperature is cooled to room temperature, methanol is added to perform demulsification, and a large amount of methanol (the use amount is subject to the fact that a sediment product can be obtained) is added subsequently to perform precipitation, and filtering is performed, and obtaining a Polymethyl Methacrylate/lithium titanate (PMMA/$Li_4Ti_5O_{12}$) composite particle precursor B. In the present step, the less the precursor A is added and the more the amount of the monomer polymer is, the more the coating amount will be. The adding amount of the emulsifier is subject to the fact that the system is fully emulsified. The more the initiator is added, the lower the molecular weight of the polymer will be. The amount of the used methanol is subject to the fact that the precursor can be fully precipitated.

Step 3: The precursor B obtained in Step 2 is calcined at a high temperature for 10 hours in a nitrogen environment, and obtained a carbon-coated lithium titanate material.

The lithium-containing compound may be one or a mixture of several of lithium carbonate, lithium hydroxide, lithium oxalate and lithium acetate with any ratio, and the titanium-containing oxide may be one or a mixture of several of rutile titanium dioxide and anatase titanium dioxide with any ratio.

Embodiment 2

A method for preparing carbon-coated lithium titanate includes the following steps.

Step 1: A lithium-containing compound and a titanium-containing oxide are weighed with a molar ratio of lithium ions to titanium ions of $Li^+:Ti^+=0.8:1$, subjected to ball milling in a ball milling jar for 6 hours, and then sintered for 5 hours, obtained a precursor A.

Step 2: 800 g of the precursor A obtained in Step 1 and 1 liter of distilled water are added to a reaction kettle, then 160 g of a monomer ethyl methacrylate and 3.5 g of an emulsifier are added, vacuumizing is performed, and then nitrogen is introduced and stirred, the system is heated to 65 degrees centigrade after being fully emulsified, and an initiator, i.e. an aqueous solution of ammonium persulfate (the content of ammonium persulfate is 0.5 g) is added slowly at this temperature, and a reaction is carried out for 4 hours, and then heating is stopped, and stirring is continued after the reaction is finished, after cooling, methanol is added to perform demulsification, and a large amount of methanol is added subsequently to perform precipitation, and filtering is performed, and obtaining a composite particle precursor B (poly(ethyl methacrylate)/lithium titanate).

Step 3: The precursor B obtained in Step 2 is calcined at a high temperature for 8 hours in a nitrogen environment, and obtained a carbon-coated lithium titanate material.

Embodiment 3

A method for preparing carbon-coated lithium titanate includes the following steps.

Step 1: A lithium-containing compound and a titanium-containing oxide are weighed with a molar ratio of lithium ions to titanium ions of $Li^+:Ti^+=0.84:1$, subjected to ball milling in a ball milling jar for 8 hours, and then sintered for 10 hours, and obtained a precursor A.

Step 2: 700 g of the precursor A obtained in Step 1 and 1 liter of distilled water are added to a reaction kettle, then 70 g of a monomer MMA and 3 g of an emulsifier are added, vacuumizing is performed, and then nitrogen is introduced and stirred, the system is heated to 70 degrees centigrade after being fully emulsified, and an initiator, i.e. an aqueous solution of ammonium persulfate (the content of ammonium persulfate is 0.4 g) is added slowly at this temperature, and a reaction is carried out for 4 hours, and then heating is stopped, and stirring is continued after the reaction is finished, after cooling, methanol is added to perform demulsification, and a large amount of methanol is added subsequently to perform precipitation, and filtering is performed, and obtaining a composite particle precursor B (PMMA/lithium titanate).

Step 3: The precursor B obtained in Step 2 is calcined at a high temperature for 10 hours in a nitrogen environment, and obtained a carbon-coated lithium titanate material.

Embodiment 4

A method for preparing carbon-coated lithium titanate includes the following steps.

Step 1: A lithium-containing compound and a titanium-containing oxide are weighed with a molar ratio of lithium ions to titanium ions of $Li^+:Ti^+=0.8:1$, subjected to ball milling in a ball milling jar for 5 hours, and then sintered for 7 hours, and obtained a precursor A.

Step 2: 500 g of the precursor A obtained in Step 1 and 1 liter of distilled water are added to a reaction kettle, then 75 g of a monomer MMA and 2.5 g of an emulsifier are added, vacuumizing is performed, and then nitrogen is introduced and stirred, the system is heated to 70 degrees centigrade after being fully emulsified, and an initiator, i.e. an aqueous solution of ammonium persulfate (the content of ammonium persulfate is 1 g) is added slowly at this temperature, and a reaction is carried out for 3 hours, and then heating is stopped, and stirring is continued after the reaction is finished, after cooling, methanol is added to perform demulsification, and a large amount of methanol is added subsequently to perform precipitation, and filtering is performed, and obtaining a composite particle precursor B (PMMA/lithium titanate).

Step 3: The precursor B obtained in Step 2 is calcined at a high temperature for 7 hours in a nitrogen environment, and obtained a carbon-coated lithium titanate material.

Embodiment 5

The lithium titanate material prepared in the first embodiment, a conductive agent carbon black and an adhesive Polyvinylidene Fluoride (PVDF) are mixed with a mass ratio of 8:1:1 and N-methylpyrrolidone (NMP) is added to prepare a slurry which is coated on a copper foil uniformly, and subsequently dried for 12 hours in vacuum at 100 degrees centigrade, and then an electrode sheet is pressed uniformly by a tablet press, and obtained an electrode sheet to be detected. A lithium sheet is used as a counter electrode, an electrolyte is a solution of 1 mol/L $LiPF_6$ containing ethyl carbonate (EC) and dimethyl carbonate (DMC) (volume ratio of EC to DMC is 1:1), and a diaphragm applies a battery diaphragm having a model of celgard2325, subsequently to assemble a CR2032 button battery is assembled in a glove box in an argon atmosphere. The battery assembled by the anode material prepared in the first embodiment is subjected to a constant current charging and discharging test in a voltage range of 1 to 2.5V. Under a rate of 10 (175 mA/g), the specific capacity of the first discharging is 155.8 mAh/g, the specific capacity of the first charging is 151.2 mAh/g, the efficiency of the first charging and discharging is 97.1%, and after 500 cycles, the specific capacity of discharging is 147.4 mAh/g, and the specific capacity of charging is 147.3 mAh/g.

Embodiment 6

Figure 2:
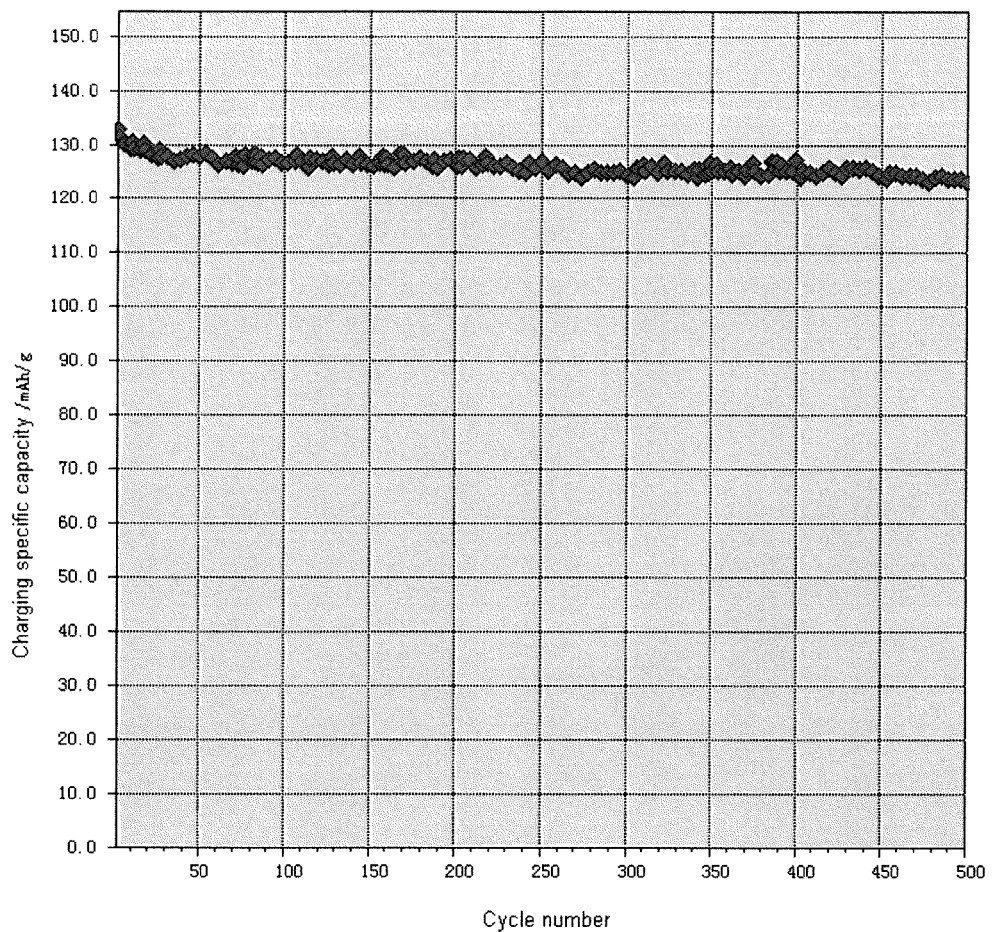
FIG. 2 is a curve illustrating 500 times of cyclic charging and discharging of a carbon-coated lithium titanate material at a rate of 5 C according to the present disclosure.

The electrode material prepared in the third embodiment is assembled into a button core test battery with the method in the fifth embodiment, and subjected to a constant current charging and discharging test in a voltage range of 1 to 2.5V. FIG. 1 shows a curve of cyclic discharging under a rate of 10 (175 mA/g). The specific capacity of the first discharging is 157.0 mAh/g, the specific capacity of the first charging is 153.7 mAh/g, the efficiency of the first charging and discharging is 97.9%, and after 500 cycles, the specific capacity of discharging is 145.2 mAh/g, and the specific capacity of charging is 145.1 mAh/g. The specific capacity of discharging has reached 92.5% of the specific capacity of the first discharging. FIG. 2 shows a curve of cyclic discharging at a rate of 5 C (875 mA/g). The specific capacity of the first discharging is 133.9 mAh/g, the specific capacity of the first charging is 131.2 mAh/g, and the efficiency of the first charging and discharging is 98.0%.

The invention claimed is:

1. A method for preparing carbon-coated lithium titanate, wherein the method comprises the following steps:
   Step 1: weighing a lithium-containing compound and a titanium-containing oxide, a molar ratio of lithium ions to titanium ions $Li^+:Ti^+$ is 0.8 to 0.84:1, performing ball milling in a ball milling jar for 4 to 8 hours, and then performing sintering for 5 to 10 hours, and obtaining a precursor A;
   Step 2: adding the precursor A obtained in the Step 1 and deionized water to a reaction kettle, then adding a monomer and an emulsifier Sodium Dodecyl Sulfate (SDS), vacuumizing, and then introducing nitrogen and stirring, heating to 60 to 70 degrees centigrade after the system is emulsified, and adding an aqueous solution of a persulfate as an initiator at this temperature, reacting for 3 to 5 hours, and then stopping heating, and continuing to stir until cooling, then adding methanol to perform demulsification, further adding methanol to perform precipitation, filtering, and obtaining a polymer/$Li_4Ti_5O_{12}$ composite particle precursor B;
   Step 3: subjecting the precursor B obtained in Step 2 to calcination for 5 to 10 hours in a nitrogen environment, and obtaining a carbon-coated lithium titanate material.

2. A method for preparing carbon-coated lithium titanate according to claim 1, wherein the lithium-containing compound in Step 1 is one or a mixture of several of lithium carbonate, lithium hydroxide, lithium oxalate and lithium acetate with any ratio.

3. A method for preparing carbon-coated lithium titanate according to claim 1, wherein the titanium-containing compound in Step 1 is a titanium oxide, including one or a mixture of several of rutile titanium dioxide and anatase titanium dioxide with any ratio.

4. A method for preparing carbon-coated lithium titanate according to claim 1, wherein the sintering temperature in Step 1 is 500 to 700 degrees centigrade.

5. A method for preparing carbon-coated lithium titanate according to claim 1, wherein a feeding amount of the precursor A in Step 2 is 200 g to 1000 g per liter of deionized water.

6. A method for preparing carbon-coated lithium titanate according to claim 1, wherein the monomer in Step 2 is one or a mixture of several of Methyl Methacrylate, ethyl methacrylate and acrylate with any ratio.

7. A method for preparing carbon-coated lithium titanate according to claim 1, wherein the mass ratio of the precursor A to the polymer monomer in Step 2 is 100:10 to 30.

8. A method for preparing carbon-coated lithium titanate according to claim 1, wherein a feeding amount of SDS in Step 2 is 2 g to 4 g per liter of deionized water.

9. A method for preparing carbon-coated lithium titanate according to claim 1, wherein the initiator in Step 2 is an aqueous solution of ammonium persulfate and a feeding amount thereof is 0.2 g to 2 g per liter of deionized water.

10. A method for preparing carbon-coated lithium titanate according to claim 1, wherein the high temperature calcination in Step 3 is performed at 700 to 900 degrees centigrade.

* * * * *